United States Patent [19]
Belanger, Jr.

[11] Patent Number: 5,145,400
[45] Date of Patent: Sep. 8, 1992

[54] SPRING CONTACTS FOR SUBSTRATE CONNECTION

[75] Inventor: Thomas D. Belanger, Jr., Saline, Mich.

[73] Assignee: AG Communication Systems Corporation, Phoenix, Ariz.

[21] Appl. No.: 814,151

[22] Filed: Dec. 30, 1991

[51] Int. Cl.$^5$ .......................................... H01R 13/629
[52] U.S. Cl. .................... 439/376; 439/341; 439/377
[58] Field of Search ................. 439/326, 341, 376, 377

[56] References Cited

U.S. PATENT DOCUMENTS

| | | | |
|---|---|---|---|
| 2,189,874 | 2/1940 | Ziganke | 439/377 |
| 3,848,952 | 11/1974 | Tighe, Jr. | 439/326 |
| 4,388,010 | 6/1983 | Mott et al. | 439/376 |

Primary Examiner—Gary F. Paumen
Attorney, Agent, or Firm—Robert J. Black; Gregory G. Hendricks

[57] ABSTRACT

A substrate connector guide for installing and electrically connecting an electrical substrate to a carrier substrate. The substrate connector guide includes guide rails mounted on the perimeter edge of the carrier substrate and electrical connectors mounted transversely between the guide rails. First and second substrate guides mounted to the carrier substrate. Each include a channel extending longitudinally along a substrate guide inner side, from an open end. A retention guide assists in maintaining the electrical substrate in proper position after insertion into the carrier substrate guide rails. Electrical connectors are also mounted and electrically connected to the electrical substrate. The electrical substrate is installed by manually inserting the electrical substrate into respective substrate guide open ends and pushing the electrical substrate along the channels. The electrical substrate rests on the carrier substrate and aligns the electrical susbstrate connectors to carrier electrical connectors. Electrical connection is completed between the electrical substrate and the carrier substrate when the electrical substrate is fully seated.

6 Claims, 1 Drawing Sheet

SPRING CONTACTS FOR SUBSTRATE CONNECTION

BACKGROUND OF THE INVENTION

1. Field of the Invention

This invention relates in general to modular electronic circuit devices and more particularly to a device for mounting and electrically connecting electrical substrates to a carrier substrate.

2. Background Art

In the past few years, the use of plug-in units for electrical components has found favor within the electronics industry. Such plug-in units generally comprise a structure upon which are mounted electrical assemblies or sub-assemblies, the structure being arranged to be plugged in a suitable socket provided on a base chassis. When so plugged the components carried by the plug-in unit are electrically connected in proper circuit relation to other electrical equipment carried by the base chassis.

It therefor is an object of the present invention to disclose a new structure for mounting and electrically connecting, electronic substrates onto carrier substrates.

SUMMARY OF THE INVENTION

In accomplishing the object of the present invention there is provided a substrate connector guide for mounting and electrically connecting an electrical substrate to a carrier substrate. The electrical substrate of the present invention includes at least one first electrical connecting device and is mounted depending from a bottom surface of the electrical substrate. The electrical connecting device is electrically connected to the electrical substrate.

First and second substrate guides are mounted to the carrier substrate in a spaced and parallel relationship to the other. Each of the first and second substrate guides include a channel extending longitudinally along a first side thereof, from an open end. The channel is further defined by a top surface and bottom surface.

At least one second electrical connecting device is mounted and electrically connected to the carrier substrate between the first and second substrate guides.

The electrical substrate is mounted to the substrate guides by manually inserting the electrical substrate into respective first and second substrate guide channels open ends and manually pushing the electrical substrate along the channels. The electrical substrate rides between respective first and second guides.

Each of the first and second substrate guides further includes at the one end thereof a retention guide section and a terminating section, each including a slot adapted to receive a transverse edge of said electrical substrate retaining said electrical substrate in proper position. The electrical substrate is urged in the forward direction with the first and second electrical connecting devices making contact. The second electrical connecting device includes a resilient spring-like member which is compressed as the electrical substrate is urged in the forward direction. When the electrical substrate is urged as far forward into the terminating section slot as it can come by virtual contact with and compression of the second electrical connector, it is lowered slightly to engage the slot portion of the retention guide and released. At this time the compression of the spring portion of the second connector against the first connector urges the electrical substrate in the reverse direction while still maintaining and still retaining electrical connection between the first electrical connecting device and the second electrical connecting device, aligning and registering the first electrical connecting device to the second electrical connecting device, and thus electrically connecting the electrical substrate to the carrier substrate.

BRIEF DESCRIPTION OF THE DRAWINGS

A better understanding of the present invention may be had from a consideration of the following detailed description taken in conjunction with the accompanying drawings in which.

DESCRIPTION OF THE PREFERRED EMBODIMENT

Figure 4:
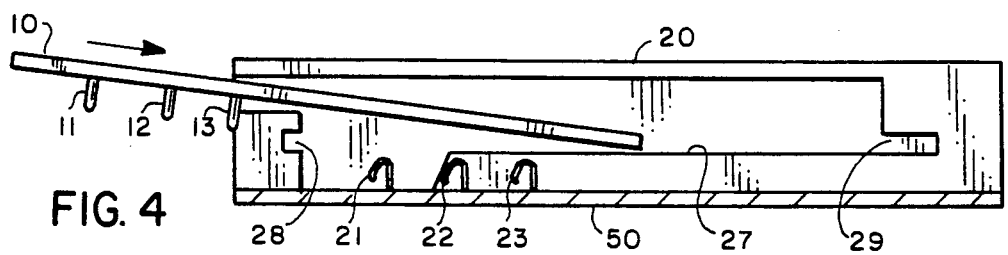
FIG. 4 is a sectional view of the electrical substrate and carrier substrate showing the initial placement and alignment of the substrates prior to the establishment of electrical connection between the two substrates in accordance with the present invention.
Figure 5:
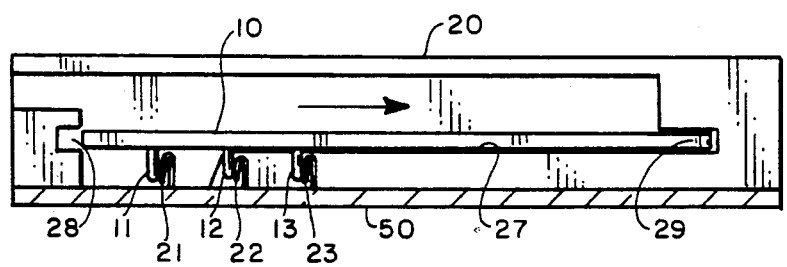
FIG. 5 is a sectional view of the electrical substrate and carrier substrate in accordance with the present invention showing the intermediate positioning of the electrical substrate on the carrier substrate in accordance with the teachings present invention.
Figure 6:
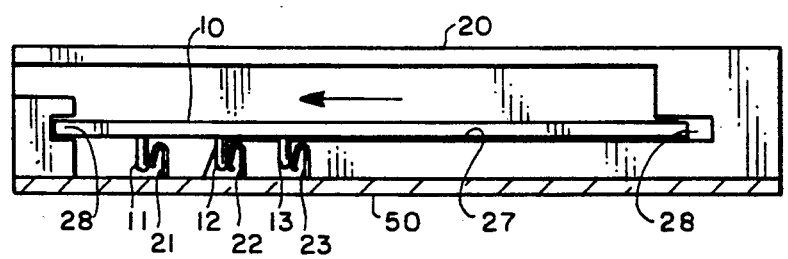
FIG. 6 is a sectional view showing the final placement of the electrical substrate and carrier substrate in accordance with the terms of the present invention and establishing electrical connection.

Referring now to the figures of the present invention, as seen in FIGS. 4, 5 and 6, rigid electrical contacts such as 11, 12 and 13 are mounted depending from the bottom surface of electrical substrate 10. The electrical connecting devices are electrically connected to the electrical substrate 10.

Figure 1:
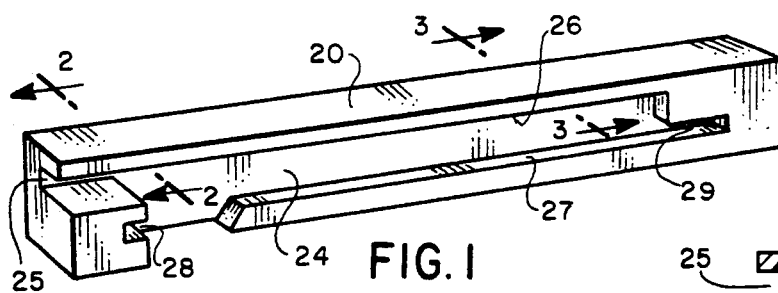
FIG. 1 is a perspective view of a substrate guide as employed in the present invention.
Figure 2:
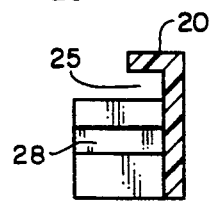
FIG. 2 is a sectional view of a substrate guide in accordance with the invention taken along lines 2—2 of FIG. 1.
Figure 3:
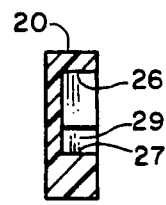
FIG. 3 is a sectional view of a substrate guide in accordance with the present invention taken along lines 3—3 of FIG. 1.
Figure 7:
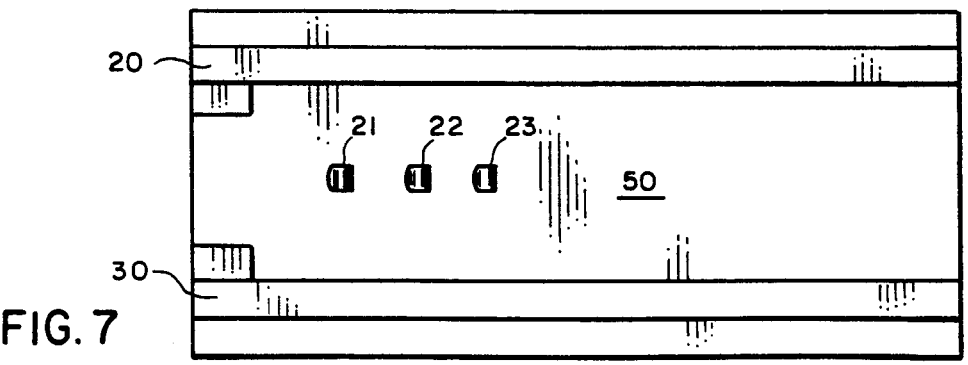
FIG. 7 is a top plan view of the substrate mounting device of the present invention mounted on the carrier substrate including placement of the second electrical connecting devices.

As seen in FIG. 7, first and second substrate guides 20 and 30 are mounted to the carrier substrate in a spaced and parallel relationship to each other as shown in FIG. 7. It is to be understood, for example, that guide 30 is a mirror image of guide 20 whose details are shown in FIG. 1. Each of the first and second substrate guides 20 and 30, respectively, include a channel, such as 24, extending longitudinally along a first side thereof from an open end 25. Such channel is further defined by a top surface 26 and a bottom surface 27.

At least one second electrical contact, shown as contacts 21, 22 and 23, is mounted and electrically connected to the carrier substrate 50 between substrate guides 20 and 30. It should be further understood that while only three of such second electrical connectors have been shown, in practice many additional electrical connectors of both first and second types would probably be included in a practical embodiment of the invention.

The electrical substrate 10 is mounted to substrate guides 20 and 30 by initially manually inserting the electrical substrate into the respective first and second substrate guide channels, such as 24, at open ends, such as 25, and then manually pushing the electrical substrate along the channels. The electrical substrate 10 obviously rides between respective first and second guides 20 and 30.

Each of the first and second guides, such as 20, further includes at one end thereof a guide section 29 including the slot adopted to receive a transverse edge of said electrical substrate, to assist in retaining said electrical substrate in proper position. The electrical substrate 10 is urged in the forward direction toward contacts 11, 12 and 13 on substrate 10, making contact with contacts 21, 22 and 23 of the carrier substrate. Each of the contacts on the carrier substrate 50, namely contacts 11, 12 and 13 includes a rigid support section and a resilient spring-like member which is compressed as the electrical substrate is urged in the forward direction. When the electrical substrate 10 is urged as far forward as it can come into retention guide section 29 and by contact and compression of contacts 21, 22 and 23, electrical substrate 10 is lowered slightly to engage slot portion 28 of the retention guide and released. At this time, compression of the spring portions of the connectors 21, 22 and 23, respectively, against connectors 11, 12 and 13, respectively, urge electrical substrate in the reverse direction while still maintaining and still retaining electrical connection between contacts 21, 22 and 23, and 11, 12 and 13, respectively. Thus electrical connection is established between the electrical substrate 10 and the carrier substrate 50.

What is claimed is:

1. A substrate connector arrangement for mounting and electrically connecting an electrical substrate to a carrier substrate comprising:
   at least a first electrical connecting device mounted along a bottom surface of said electrical substrate, electrically connected to said electrical substrate;
   first and second separate substrate guides mounted to a top surface of said carrier substrate in a spaced and parallel relationship to each other, each of said substrate guides including a channel extending longitudinally along an inner side thereof;
   each of said channels including a first end including an opening and retention means;
   each of said channels further including a second end;
   at least a second electrical connecting device electrically connected and mounted to said carrier substrate between said first and second substrate guides;
   said second electrical connecting device including a compliant section facing in the direction of said first and second substrate guide first ends;
   said electrical substrate inserted in said first and second guide channels with said first electrical connecting device in contact with said second electrical connecting device;
   said electrical substrate in response to said compliant section of said second electrical connecting device resiliently engaging said first electrical connecting device, being positioned into said retention means in said substrate guide first end, thus aligning and registering said first electrical connecting device to said second electrical connecting device whereby said first electrical connecting device mates with said second electrical connecting device, electrically connecting said electrical substrate to said carrier substrate.

2. A substrate connector guide arrangement as claimed in claim 1 wherein:
   said electrical substrate includes first and second edges positioned in said first and second substrate guides, respectively.

3. A substrate connector guide arrangement as claimed in claim 1 wherein:
   said first electrical connecting device is of rigid construction.

4. A substrate connector guide arrangement as claimed in claim 3 wherein:
   said second electrical connecting device includes a rigid section supported by said carrier substrate;
   and said rigid section supports said compliant section.

5. A substrate connector arrangement as claimed in claim 4 wherein:
   said first electrical connecting device initially operates to position said compliant section of said second connecting device toward said rigid portion of said second connecting device.

6. A method of mounting and electrically connecting an electrical substrate including at least a first electrical connecting device located along a bottom surface of and electrically connected to said electrical substrate, to a carrier substrate including first and second separate substrate guides mounted to said carrier substrate in a spaced and parallel relationship, each of said substrate guides including a channel extending longitudinally along an inner side thereof from a first end including an opening and retention means to a second end, said carrier substrate further including a second electrical connecting device including a compliant section electrically connected and mounted to said carrier substrate between said first and second substrate guides, said method comprising the steps of:
   manually inserting said electrical substrate in said first and second guide channels at said first end openings;
   manually pushing said electrical substrate along said channels until said first electrical connecting device encounters said second electrical connecting device;
   further moving said electrical substrate an additional distance toward said second end, thereby compressing said compliant section of said second connecting device;
   lowering said electrical substrate into a location in alignment with said guide channels;
   releasing said electrical substrate;
   and responsive to said compliant section of said electrical connecting device said electrical substrate is urged in a rearward direction into said retention means, aligning and registering said first electrical connecting device to said second electrical connecting device;
   whereby said first electrical connecting device mates with said second electrical connecting device electrically connecting said electrical substrate to said carrier substrate.

* * * * *